(12) United States Patent
Matsuo et al.

(10) Patent No.: US 6,882,060 B2
(45) Date of Patent: Apr. 19, 2005

(54) TURBINE GENERATING APPARATUS

(75) Inventors: Kazuya Matsuo, Kakogawa (JP); Masahide Kawamura, Akashi (JP); Osamu Noro, Akashi (JP); Tatsuo Fujii, Kobe (JP)

(73) Assignee: Kawasaki Jukogyo Kabushiki Kaisha, Kobe (JP)

( * ) Notice: Subject to any disclaimer, the term of this patent is extended or adjusted under 35 U.S.C. 154(b) by 88 days.

(21) Appl. No.: 10/367,846

(22) Filed: Feb. 19, 2003

(65) Prior Publication Data
US 2004/0066044 A1 Apr. 8, 2004

(30) Foreign Application Priority Data

Feb. 18, 2002 (JP) ........................................ 2002-040639

(51) Int. Cl.[7] .............................................. H02P 9/08
(52) U.S. Cl. .............................. 290/52; 363/57; 322/32
(58) Field of Search ............................. 290/52; 363/57; 322/10, 32

(56) References Cited

U.S. PATENT DOCUMENTS

| | | | | |
|---|---|---|---|---|
| 5,635,768 A | * | 6/1997 | Birch et al. ................. | 290/40 C |
| 6,175,217 B1 | * | 1/2001 | Da Ponte et al. ............ | 322/19 |
| 6,281,601 B1 | * | 8/2001 | Edelman et al. ............. | 307/29 |
| 6,323,625 B1 | * | 11/2001 | Bhargava ..................... | 322/32 |
| 6,410,992 B1 | * | 6/2002 | Wall et al. ................... | 290/52 |
| 6,487,096 B1 | * | 11/2002 | Gilbreth et al. ............. | 363/35 |
| 6,605,928 B1 | * | 8/2003 | Gupta et al. ................. | 322/10 |
| 6,611,437 B1 | * | 8/2003 | Kawazoe et al. ............ | 363/37 |
| 6,611,438 B1 | * | 8/2003 | Kawazoe et al. ............ | 363/37 |
| 6,664,654 B1 | * | 12/2003 | Wall et al. ................... | 290/52 |

FOREIGN PATENT DOCUMENTS

| | | | | |
|---|---|---|---|---|
| JP | 11-122995 | | 4/1999 | |
| JP | A 11-356097 | | 12/1999 | |
| JP | 2001-527180 | | 12/2001 | |
| JP | 2003244996 A | * | 8/2003 | ............ H02P/9/04 |
| JP | 2003322028 A | * | 11/2003 | ............ F02C/6/14 |
| WO | WO 9932769 A1 | * | 7/1999 | ............ F02C/6/14 |
| WO | WO 02095929 A1 | * | 11/2002 | |

* cited by examiner

Primary Examiner—Joseph Waks
(74) Attorney, Agent, or Firm—Oliff & Berridge, PLC

(57) ABSTRACT

A turbine generating apparatus includes a control unit which controls the turbine generating apparatus as follows. During a system connection running mode, a fuel is fed to the gas turbine at a fuel flow rate corresponding to a preset load. The converter prepares a pseudo-system in which a frequency conforms to a set rotational speed of the gas turbine at the preset load, and converts an output of the generator to a direct current in a state that a number of revolutions of the gas turbine is specified by operating the generator synchronously with the pseudo-system. A power to be taken out is controlled depending on a magnitude of a turbine output. The inverter converts a DC voltage output from the converter to an AC voltage by a pulse width modulation at a system voltage and a system frequency so as to keep the DC voltage output from the converter at a predetermined voltage.

19 Claims, 12 Drawing Sheets

TURBINE GENERATING APPARATUS

BACKGROUND OF THE INVENTION

1. Field of the Invention

The present invention relates to a turbine generating apparatus having a permanent magnet type synchronous generator driven by a gas turbine to generate electric power.

2. Description of the Related Art

A turbine generator with a gas turbine such as a micro-gas turbine directly connected to a synchronous generator uses a generation frequency which is the product of the rotational speed of the turbine (hereinafter, may be referred to as the number of revolutions) and the number of pole pairs of the generator and generates electric power at a higher frequency than the commercial frequency (50 or 60 Hz). For example, a generator of 2 poles (the number of pole pairs is 1) directly connected to a turbine of 60000 rpm generates 1-kHz power. Further, in such a generator of high-speed rotation, to ensure strength for withstanding centrifugal force and increase the output density as a miniature generator, a generator using a permanent magnet of a strong rare-earth element for the magnetic poles of the rotor is used. Namely, the permanent magnet type synchronous generator is, unlike a generator having a magnetic winding, a generator in which the magnetic field intensity cannot be operated and the generation voltage cannot be controlled. To utilize the generation output, it must be converted to the commercial frequency (50 or 60 Hz) and voltage (for example, 3-phase 220 V). The conventional art of a device for performing this power conversion adopts a constitution of converting the power to a direct current once by a rectifier circuit and then converting the DC power again to an alternating current at a required frequency and voltage by an inverter (for example, Japanese Patent Laid-Open Publication 11-356097).

FIG. 12 is a block diagram showing the constitution of the conventional art at the time of generation. A gas turbine 111 drives a permanent magnet type synchronous generator 112, and the output of the generator 112 is converted to a direct current by a rectifier circuit 113 realized by a diode bridge, and the direct current is converted to a voltage of the commercial AC power, for example, 220 V and a frequency, for example, 50 or 60 Hz by an inverter 114 for performing pulse width modulation (PWM).

FIG. 13 is a block diagram showing the constitution of the conventional art shown in FIG. 12 at the time of start. The power of a system 115 for supplying the commercial AC power is converted to DC power by the rectifier circuit 113, converted to a frequency suited to the generator 112, for example, 1 to 1.6 kHz by the inverter 114, and given to the generator 112. By doing this, the generator 112 operates as a motor and drives and rotates the gas turbine 111. Fuel is fed to the gas turbine 111 and ignited, and, as the output of the gas turbine 111 increases, the output of the generator is derived.

In the conventional art shown in FIGS. 12 and 13, the frequency for pulse width modulation of the inverter 114 is, as mentioned above, 50 to 60 Hz at the time of system connection shown in FIG. 12 and 1 to 1.6 kHz at the time of start shown in FIG. 13.

Further, the gas turbine generally has a property that when the output is lower than the rated output, running at a number of revolutions smaller than the rated number of revolutions improves the efficiency and when the gas turbine is to be operated in serious consideration of efficiency, the number of revolutions must be changed according to the output. On the other hand, the synchronous generator driven by the gas turbine has a property that the induced voltage is proportional to the number of revolutions and in a generator capable of controlling no magnetic field like the aforementioned permanent magnet type synchronous generator, the voltage is also changed depending on the number of revolutions. Therefore, to efficiently operate the turbine generator, regardless of frequency changes and voltage changes of the generated power, a power converter capable of converting the power to a fixed voltage and frequency is required.

The aforementioned conventional art shown in FIGS. 12 and 13 has a constitution that the generated power is converted to a direct current once by the rectifier circuit 113, and then the DC power is converted again to an alternating current at a required frequency and voltage, and the rectifier circuit 113 is formed as a passive diode rectifier circuit. Therefore, the DC voltage after rectified varies in proportion to the generation voltage. Further, when the inverter 113 of the pulse width modulation (PWM) type is used, the output voltage can be controlled to a certain extent by the PWM rate. However, the range thereof is limited and when the voltage of the DC part, to which the output of the rectifier circuit 113 is given, is changed greatly, the output voltage after AC conversion by the inverter 114 cannot be kept fixed. Namely, when the voltage of the DC part is increased, although it is possible to make the duty of each pulse of PWM (the interval that the pulse is on during one period) smaller, the adjustable range is limited. When the voltage of the DC part is reduced below a certain value, even if the duty of each pulse of PWM is maximized, the output voltage cannot be held. Further, when the voltage of the DC part inversely exceeds the limit, a voltage more than the breakdown voltage is applied to the switching power transistor of the inverter 114 and the power transistor is destroyed. Therefore, to output a fixed voltage from the inverter, the number of revolutions of the generator 112 is restricted in correspondence with the restriction to the voltage range of the DC part.

A method of enlarging the range of the number of revolutions of the generator 112 capable of obtaining a predetermined output voltage from the inverter 114 is as indicated below. Firstly, the induced voltage of the generator 111 is designed high and even if the number of revolutions is small, the voltage is ensured. Then, the breakdown voltage of the power transistor of the inverter 114 is increased so that the power transistor can withstand voltage rise during the rated rotation of the generator 112. In this case, during the rated rotation, the duty of PWM is narrowed so as to generate a predetermined voltage. Then, a problem arises that only a part of the capacity of the power transistor is used.

The aforementioned problem that only a part of the capacity of the power transistor is used is solved if a rectification method of holding the DC part at a fixed voltage is used within a wide range of the number of revolutions. With respect to it, there is a conventional art referred to as a PWM converter. The conventional art switches the transistor bridge according to the voltage of the generator by PWM and is characteristic in that it can operate the DC voltage after conversion. Therefore, as a power conversion method corresponding to changes in the generation frequency and voltage of the generator, a constitution that a PWM converter and a PWM inverter are combined via the DC part may be possible.

However, due to the restriction on the response speed of the present power transistor, the maximum PWM frequency is 10 kHz or so practically. Further, when the generation frequency is higher than 1 kHz, for example, when a microcomputer controls PWM, due to the restriction on the response speed of the microcomputer, another problem will arise that it is difficult to fit the PWM timing to the generation voltage.

An object of the present invention is to provide a turbine generating apparatus for stably converting high frequency output of a synchronous generator at a varying frequency and voltage to a required frequency and voltage and outputting the same.

SUMMARY OF THE INVENTION

According to the first aspect of the present invention, a turbine generating apparatus comprises: (a) a turbine generator including a gas turbine capable of controlling an output thereof by a fuel flow rate and a permanent magnet type synchronous generator connected to said gas turbine, (b) a converter connected to said turbine generator, (c) an inverter connected between said converter and an AC connection system, and (d) a control unit for controlling said turbine generating apparatus so that, during a system connection running mode, a fuel is fed to said gas turbine at a fuel flow rate corresponding to a preset load, said converter prepares a pseudo-system in which a frequency conforms to a set rotational speed of said gas turbine at said preset load, and converts an output of said generator to a direct current in a state that a number of revolutions of said gas turbine is specified by operating said generator synchronously with said pseudo-system, a power to be taken out is controlled depending on a magnitude of a turbine output, and said inverter converts a DC voltage output from said converter to an AC voltage by a pulse width modulation at a system voltage and a system frequency so as to keep said DC voltage output from said converter at a predetermined voltage.

For example, the output power of the synchronous generator, which is generated at a three-phase or single-phase voltage and frequency, is converted to, for example, the system voltage and frequency of the commercial power by the action of the converter and the inverter. The output of the converter may be given to a DC voltage source, that is, between the DC voltage source and the output terminal of the synchronous generator, the converter is installed. Further, between the three-phase or single-phase output terminal for outputting power at a required voltage and frequency to the system and the DC voltage source, the inverter is installed. By the pulse width modulation operation of the converter, using the synchronizing power of the synchronous generator, the output terminal voltage and frequency of the generator are set. For example, a pattern of output voltage and frequency is predetermined and according to the pattern, the duty is set and pulse width modulation control is performed.

During the system connection operation, the generated power of the synchronous generator driven by the gas turbine is taken out by a current flowing in the DC voltage source such as a power storage element via the converter. The power flowing in the DC voltage source is converted to the system voltage and system frequency by the inverter and derived. The DC voltage source balances the power by the current flowing from the synchronous generator with the output power, thereby keeps the DC voltage thereof fixed.

By mounting the power storage element, changing of the voltage can be suppressed, though the power storage element may be omitted. The power storage element can be realized by a storage battery or a capacitor.

Power control of a motor which is a gas turbine, accordingly control of the flow rate of fuel to be fed to the gas turbine is performed according to a required power load. A rotational speed suited to generation of the required power is set on the basis of the property of the gas turbine and the frequency corresponding to the rotational speed is applied to the output terminal of the synchronous generator.

As mentioned above, according to the first aspect of the present invention, a high frequency pseudo-system by the synchronous generator is prepared, and the gas turbine is synchronously operated by the synchronizing power of the synchronous generator, and the generated power is taken out. The gas turbine has a property that, during running at an output lower than the rated output, by operating at a lower rotational speed than the rated rotational speed, higher efficiency can be produced. Therefore, to perform an operation in serious consideration of efficiency, the rotational speed must be changed according to the output. According to the first aspect of the present invention, a function for preventing changes in the DC voltage due to changes in the rotational speed and stabilizing the DC voltage can be realized.

The first aspect of the present invention sets the generation terminal voltage of a high-speed synchronous generator by a converter which can be realized by, for example, a transistor bridge for converting AC and DC, synchronizes the generator with the same, thereby takes out generated power and converts it to DC power. In this system, DC power is further converted to AC power at a predetermined frequency and voltage of the inverter system, thereby the generated power of the high-speed generator is converted. When the inverter output is under system connection, the inverter performs the PWM control for keeping the voltage of the DC voltage part fixed and performs the power control by adjusting the fuel flow rate of the gas turbine by comparison with the target power value.

Further, in not only a case of system connection but also a case of independent operation, an optimal number of revolutions is selected according to the load, and the frequency of the terminal voltage of the generator which is generated by the converter is controlled. The converter is a PWM converter, so that when the frequency is changed by the permanent magnet generator, particularly also when the generated voltage at the time of low rotational speed drops, the voltage of the DC voltage part can be kept fixed.

The synchronizing power will be described hereunder. When the generator is generating power, the phase of the induced voltage of the generator is advanced from that of the terminal voltage and a current with the difference between the induced voltage and the terminal voltage removed by the impedance of the winding of the generator flows from the generator terminal toward the converter. The impedance includes the inductance and resistance of the winding, the eddy-current loss and hysteresis loss of the stator iron core and rotor, and the effect of the magnetic field (armature reaction) exerted by a current flowing through the winding. By the mutual action of the current and magnetic field, deceleration torque is acted on the rotor of the generator and when the deceleration torque and the power from the motor are balanced, the generator continues power generation in a stable state. When the drive torque of the motor is reduced in this state, the electrical deceleration torque is increased, and the rotor of the generator is decelerated, and the phase of the induced voltage of the generator against the voltage generated by the converter is reduced. As a result, the current flowing from the generator toward the converter is reduced, and the torque for electromagnetically decelerating the rotor is also reduced, and a new balanced state with the generated power reduced is realized.

When the drive torque of the motor which is a gas turbine is increased inversely, the drive torque of the motor becomes larger than the electrical deceleration torque, and the rotor of the generator is accelerated, and the phase of the induced voltage of the generator against the voltage generated by the converter is reduced. As a result, the current flowing from the generator toward the converter is increased, and the deceleration torque for electromagnetically acting on the rotor is also increased, and a new balanced state with the generated power increased is realized.

As mentioned above, according to the phase difference between the induced voltage and the terminal voltage specified by the converter, acceleration torque or deceleration torque is electrically generated in the generator. This is referred to as synchronizing power, which acts on the voltage frequency generated by the converter so as to prevent the number of revolutions of the generator from deviation. Namely, the frequency of the terminal voltage of the generator set by the converter is increased or decreased in a stationary state, thus the number of revolutions of the operation of the turbine can be increased or decreased following it.

Furthermore, when the torque of the gas turbine for driving the generator is low, the phase of the induced voltage of the generator is delayed from that of the terminal voltage of the generator, so that inversely to the time of generation, a current flows from the terminal toward the generator, and the generator operates as a motor, and electrical torque is generated so as to accelerate the rotation.

As mentioned above, by the power conversion system in the present invention, from the state that the generator rotates as a motor to the state that power is taken out from the generator, the rotation of the generator can be controlled continuously without stopping. By doing this, in the same output state, an optimal number of revolutions can be selected and operated.

The synchronizing power for allowing the generator to follow the frequency of the terminal voltage of the generator generated by the converter is limited and the generator cannot follow sudden changes in the frequency. Further, if it is attempted to take out large power at a low generated frequency, the drive torque of the turbine acts beyond the limit of torque which can be generated electrically and the number of revolutions of the generator cannot follow likewise the terminal voltage and frequency. This phenomenon is referred to as step-out. To prevent step-out, the terminal voltage and frequency are controlled in correspondence to the drive torque of the turbine or fuel is controlled within the range of power which can be generated at the number of revolutions corresponding to the set terminal voltage and frequency and hence power conversion control and turbine control are connected, thus the effect of power conversion of the present invention is produced.

As amounts for specifying the terminal voltage of the generator, there are a frequency and a voltage. The frequency is set to specify the rotation of the generator, while the voltage specifies the ratio of the power-factor at the terminal of the generator to the synchronizing power for the phase difference between the induced voltage and the terminal voltage. A voltage for a power-factor of 1 at the terminal of the generator exists. When the terminal voltage is set higher than it, the synchronizing power is increased, while the power-factor is reduced, and the generation efficiency gets worse, and when the terminal voltage is set lower than it, the synchronizing power is reduced and the power-factor is also reduced. To prevent step-out, the generator is controlled so as to increase the voltage in the transient state and set the power-factor to 1 in the stable stage.

When the output of the inverter is connected to the system, the output voltage is controlled by the system. The inverter sends the power to the system. In this case, the inverter cannot control the voltage, and the voltage control is not necessary, and the inverter controls the power to be output. For example, (1) in an embodiment, fuel of the motor is controlled so as to output predetermined power to the inverter, set the number of revolutions according to the power by the converter, and control the resultant change in the voltage of the DC power source. (2) Or, in another embodiment, fuel corresponding to required electric energy is fed to the motor, and the number of revolutions according to the power is set by the converter, and the inverter controls the transistor so as to fix the voltage of the DC power source.

The present invention sets the voltage at the output terminal of the generator by the power converter, thereby allows the rotational frequency of the generator to follow it using the synchronizing power of the generator, and takes out electric power corresponding to power generated by the motor which is a gas turbine. Namely, the present invention is characterized in that the power conversion operation is not performed depending on the generated voltage, and inversely the power converter specifies the voltage and frequency and allows the rotation of the generator to follow it, thus the power is converted.

According to the second aspect of the present invention, a turbine generating apparatus comprises: (a) a turbine generator including a gas turbine capable of controlling an output thereof by a fuel flow rate and a permanent magnet type synchronous generator connected to said gas turbine, (b) a converter connected to said turbine generator, (c) an inverter connected between said converter and an AC connection system, and (d) a control unit for controlling said turbine generating apparatus so that, during an independent running mode, said converter prepares a pseudo-system in which a frequency conforms to a set rotational speed of said gas turbine at a power load which is detected, and converts an output of said generator to a direct current in a state that a number of revolutions of said gas turbine is specified by operating said generator synchronously with said pseudo-system, a fuel is fed to said gas turbine at a fuel flow rate which corresponds to said power load which is detected and keeps a DC voltage output from said converter at a predetermined voltage, and said inverter converts said DC voltage output from said converter to an AC voltage by a pulse width modulation so as to keep said AC voltage output from said inverter at a predetermined voltage and keep a frequency of said AC voltage output from said inverter at a predetermined frequency.

According to the third aspect of the present invention, a turbine generating apparatus capable of changing an operating mode thereof comprises: (a) a turbine generator including a gas turbine capable of controlling an output thereof by a fuel flow rate and a permanent magnet type synchronous generator connected to said gas turbine, (b) a converter connected to said turbine generator, (c) an inverter connected between said converter and an AC connection system, and (d) a control unit for controlling said turbine generating apparatus so that, during a system connection running mode, a fuel is fed to said gas turbine at a fuel flow rate corresponding to a preset load, said converter prepares a pseudo-system in which a frequency conforms to a set rotational speed of said gas turbine at said preset load, and converts an output of said generator to a direct current in a state that a number of revolutions of said gas turbine is specified by operating said generator synchronously with said pseudo-system, a power to be taken out is controlled depending on a magnitude of a turbine output, and said inverter converts a DC voltage output from said converter to an AC voltage by a pulse width modulation at a system voltage and a system frequency so as to keep said DC voltage output from said converter at a predetermined voltage, during an independent running mode, said converter prepares a pseudo-system in which a frequency conforms to a set rotational speed of said gas turbine at a power load which is detected, and converts an output of said generator to a direct current in a state that a number of revolutions of said gas turbine is specified by operating said generator synchronously with said pseudo-system, a fuel is fed to said gas turbine at a fuel flow rate which corresponds to said power load which is detected and keeps a DC voltage output from said converter at a predetermined voltage, and said inverter converts said DC voltage output from said converter to an AC voltage by a pulse width modulation so as to keep said AC voltage output from said inverter at a predetermined voltage and keep a frequency of said AC voltage output from said inverter at a predetermined frequency.

According to the second or third aspect of the present invention, in a case of independent running, the inverter controls the output voltage so as to be fixed. The inverter detects changing in the load from the output thereof and controls fuel according to the load. During the independent running, the frequency and voltage must be kept fixed regardless of the power load and for that reason, the inverter controls the output voltage and frequency so as to be fixed. The output power varies with the load. To correspond to changing in the power, the output of the motor which is a gas turbine is changed. When the output of the motor cannot follow transient changing in the load power, a power storage element such as a storage battery or a capacitor is mounted in the DC voltage source and the stored power allows the output of the motor to follow transient changing in the power.

In the first, second or third aspect of the present invention, a power storage element may be mounted between the converter and the inverter.

Moreover, the control unit may control the turbine generating apparatus so that, during starting, the inverter converts a power of said system to a DC power by a pulse width modulation at a frequency of said system, the converter increases a frequency with time and gives the frequency to the synchronous generator operating as a synchronous motor by pulse-width modulating a DC power output from the inverter, the fuel flow rate to be given to the gas turbine is increased with time in a course of increasing the frequency, whereby a current flowing toward the synchronous generator is inverted so as to flow out from the synchronous generator.

Moreover, control unit may control the turbine generating apparatus so that, during stopping, the fuel flow rate to be given to the gas turbine is decreased with time, and the converter decreases with time the frequency for pulse-width modulating the DC power to be output to the inverter in a course of decreasing the fuel flow rate.

According to the present invention, when the frequency of the voltage generated by the converter is increased, the generator operates as a motor and the number of revolutions increases following the frequency of the voltage generated by the converter. In this course, when fuel is fed and ignited, the motor is started. When fuel is continuously increased and the number of revolutions is increased at the same time, the motor generates power via an independent state and the generator connected to it generates electric power. The current flowing in the generator operating as a motor at first from the DC voltage source via the power converter inverts the direction in correspondence to generation of electric power by the generator and flows from the generator toward the DC voltage source. Namely, from start to running as a stationary generator, continuous running is available. To stop, a continuous operation can be performed in the reverse order.

The converter may includes: a converter bridge circuit having a converter switching element with a control terminal for a switching operation of turning power on or off; and a converter control circuit for giving a control signal for said switching operation to said control terminal of said converter switching element.

The inverter may include: an inverter bridge circuit having an inverter switching element with a control terminal for a switching operation of turning power on or off; and an inverter control circuit for giving a control signal for said switching operation to said control terminal of said inverter switching element.

The converter and inverter may have a bridge circuit, and the bridge circuit is composed of, for example, switching elements such as a transistor, accordingly operations in a case of the system connection running and independent running for supplying electric power to the system or load from the turbine generator and in a case that electric power is supplied to the synchronous generator from the system so as to start can be performed smoothly. In other embodiments of the present invention, the converter and inverter may have another constitution in place of the bridge circuit.

According to the fourth aspect of the present invention, a turbine generating apparatus comprises: a converter preparing a pseudo-system in which a frequency conforms to a set rotational speed of a gas turbine according to a load; a control unit controlling said turbine generating apparatus so that said converter converts an output of a generator to a direct current in a state that a number of revolutions of said gas turbine is specified by operating a generator synchronously with said pseudo-system, wherein, when a required electric power is lower than a specified value, said control unit decreases said frequency output by said converter, reduces the number of revolutions of said gas turbine, thereby enables an operation at a number of revolutions for optimizing a turbine efficiency.

DESCRIPTION OF THE PREFERRED EMBODIMENTS

Figure 1:
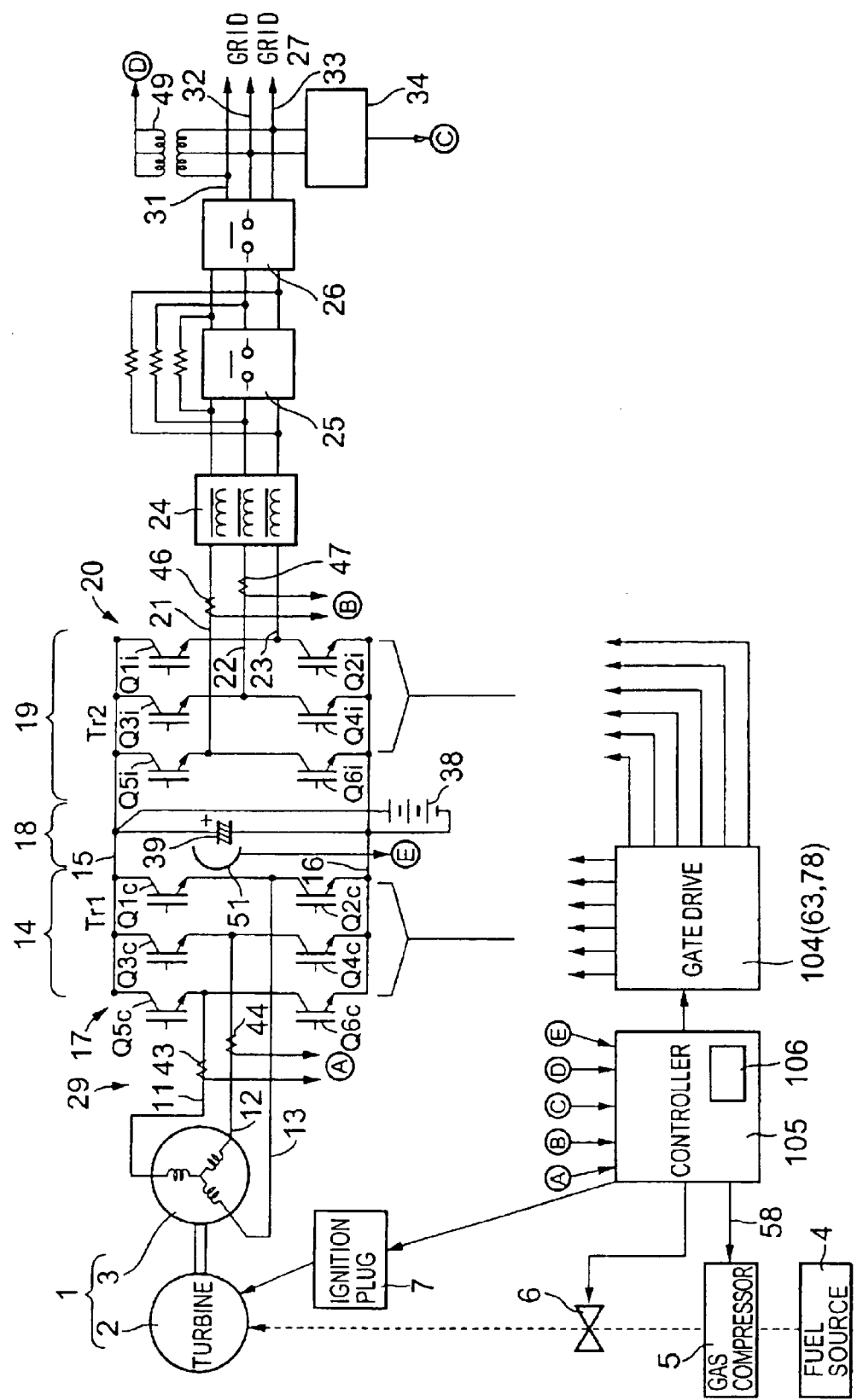
FIG. 1 is a schematic block diagram showing the whole constitution of an embodiment of the present invention.

As shown in FIG. 1, a turbine generator 1 includes a gas turbine 2 and a permanent magnet type synchronous generator 3. Fuel is fed to the gas turbine 2 from a fuel source 4 to feed fuel gas via a gas compressor 5 for controlling the fuel feed rate and further via a shut-off valve 6. The gas turbine 2 is provided with a spark plug 7 for igniting fuel by a spark. By controlling the fuel flow rate, the output of the gas turbine 2 is controlled and the rotational speed can be controlled.

The permanent magnet type synchronous generator 3 includes a rotor having a permanent magnet and a stator having a magnetic coil and is driven and rotated by the rotor directly connected to the output shaft of the gas turbine 2. Thereby, an induced voltage having a frequency corresponding to the rotational speed is generated. Further, when the magnetic coil is supplied with and excited by AC power, the permanent magnet type synchronous generator 3 operates as a synchronous motor, generates torque, and can start rotation of the gas turbine 2.

The magnetic coil of the generator 3 is, for example, of a star quad type and connected to a converter 14 via lines 11, 12, and 13. The converter 14 has a converter bridge circuit 17 connected between lines 15 and 16. The converter bridge circuit 17 includes switching transistors Q1c and Q2c, Q3c and Q4c, and Q5c and Q6c for each phase which are connected in series between the lines 15 and 16 and is connected to the lines 11, 12, and 13.

Between the lines 15 and 16, a DC voltage part 18 is installed and an inverter 19 is further installed. The inverter 19 has an inverter bridge circuit 20 connected between the line 15 and 16. The inverter bridge circuit 20 is similar to the aforementioned converter bridge circuit 17, has inverter switching transistors Q1i and Q2i, Q3i and Q4i, and Q5i and Q6i connected in series for each phase, and is connected to lines 21, 22, and 23. The switching transistors Q1c to Q6c and Q1i to Q6i may be realized by switching elements other than transistors having control terminals for performing the switching operation of On and Off.

The lines 21, 22, and 23 are connected to a grid 27 of commercial AC power via a reactor 24, a rush current preventive circuit 25, and a circuit breaker 26. The turbine generator 1, the converter 14, the DC voltage part 18, the inverter 19, the reactor 24, the rush current preventive circuit 25, and the circuit breaker 26 constitute a turbine generating apparatus 29 as an embodiment of the present invention. The turbine generating apparatus 29 is connected to the grid 27 via lines 31, 32, and 33. A control power source 34 is connected to the lines 31, 32, and 33.

Among the lines 11 to 13 connecting the turbine generator 1 and the converter 14, on the lines 11 and 12, current sensors 43 and 44 are provided and detect currents flowing through the lines 11 and 12. Among the lines 21 to 23 connecting between the inverter 19 and the reactor 24, on the lines 21 and 22, current sensors 46 and 47 for detecting currents flowing through the lines 21 and 22 are provided. To the lines 31 to 33 connecting the circuit breaker 26 and the grid 27, a voltage sensor 49 for detecting an inter-line voltage is connected. To the lines 15 and 16 of the DC voltage part 18, a voltage sensor 51 for detecting the voltage of the DC voltage part 18 is connected.

Figure 2:
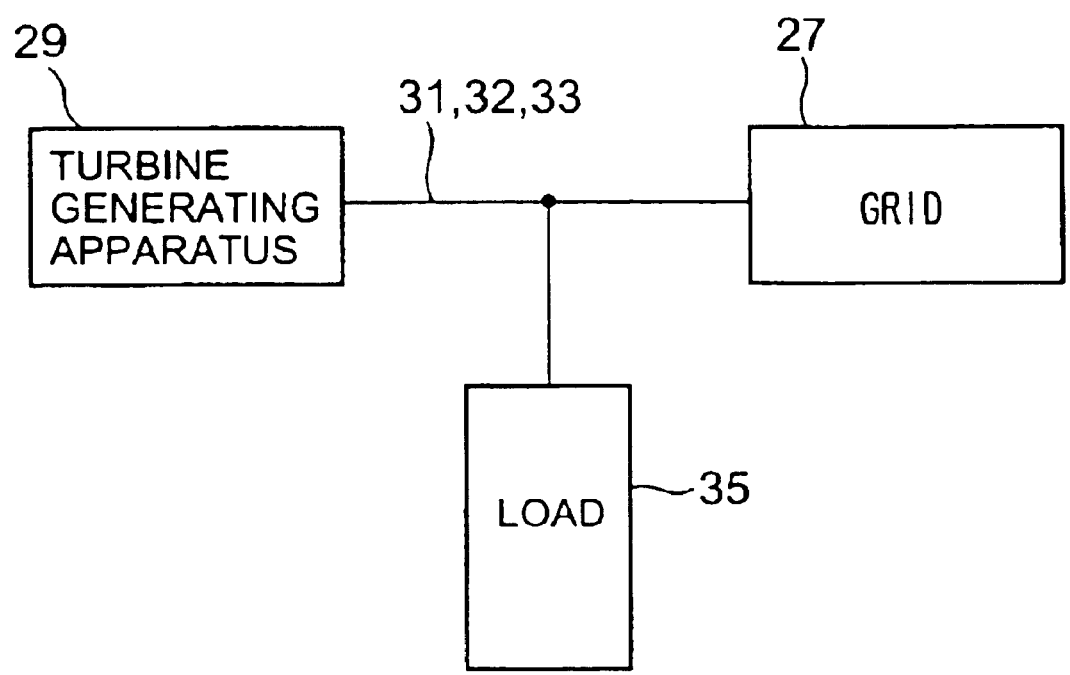
FIG. 2 is a schematic block diagram showing the constitution during system connection running when the turbine generating apparatus and the system shown in FIG. 1 are connected.

FIG. 2 is a schematic block diagram showing the constitution that the turbine generating apparatus 29 and the grid 27 shown in FIG. 1 are connected during system connection running. To the lines 31, 32, and 33, a load 35 consuming electric power is connected. Three-phase AC power from the turbine generating apparatus 29 and/or three-phase AC power from the grid 27 are supplied to the load 35. By doing this, system connection running can be performed for the turbine generating apparatus 29.

Figure 3:
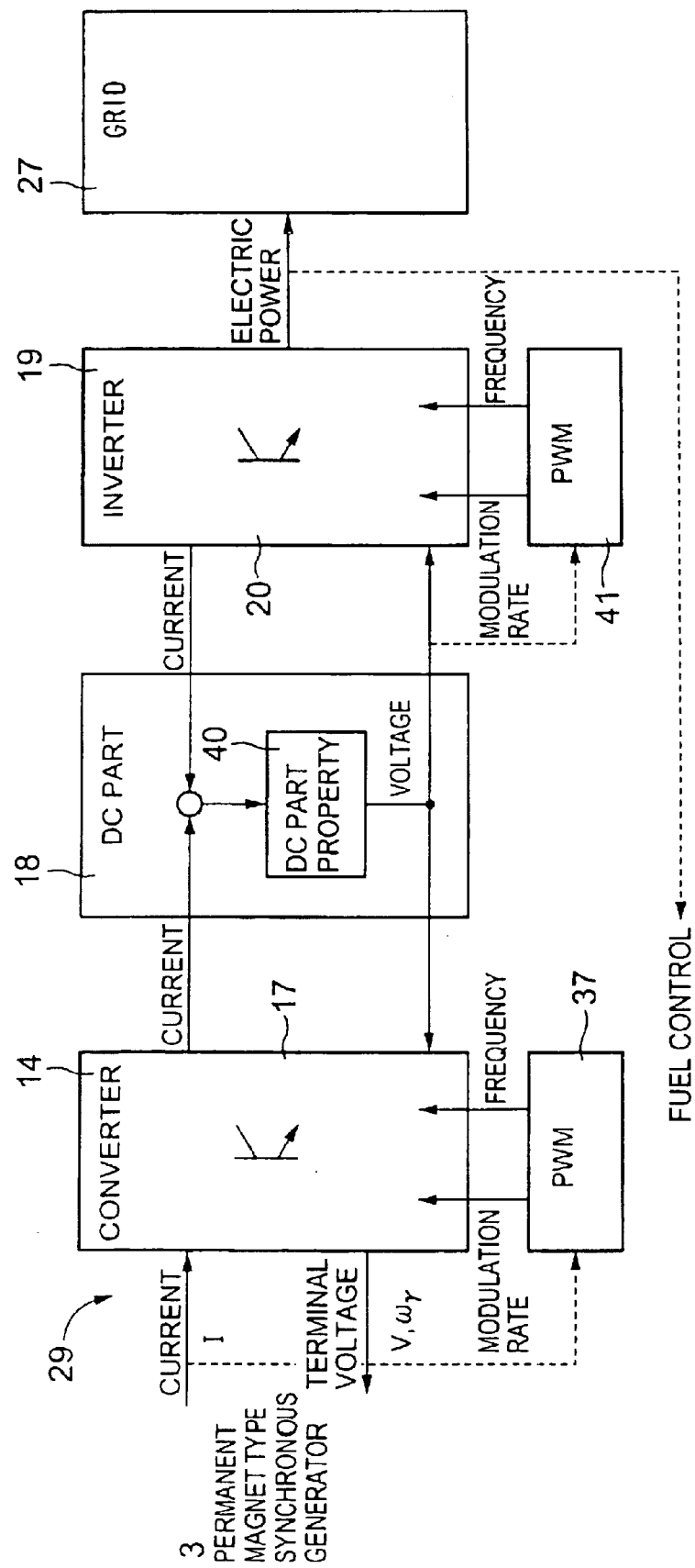
FIG. 3 is a schematic block diagram of the turbine generating apparatus during system connection running.

FIG. 3 is a schematic block diagram of the turbine generating apparatus 29 during system connection running. The converter 14 includes a converter control circuit 37 for giving a control signal to the gates or bases which are control terminals for the switching operation for turning on or off the converter switching transistors Q1c to Q6c constituting the converter bridge circuit 17. The DC voltage part 18 may include power storage elements 40 such as a storage battery 38 and a capacitor 39 which are connected between the lines 15 and 16. The present invention may be realized by a constitution that the power storage element 40 such as the storage battery 38 is omitted, and the converter 14 and the inverter 19 are connected by the lines 15 and 16.

The inverter 19 includes an inverter control circuit 41 for giving a control signal for the switching operation to the inverter bridge circuit 20 and the gates or bases for the switching operation for turning on or off the inverter switching transistors Q1i to Q6i constituting the inverter bridge circuit 20.

Figure 4:
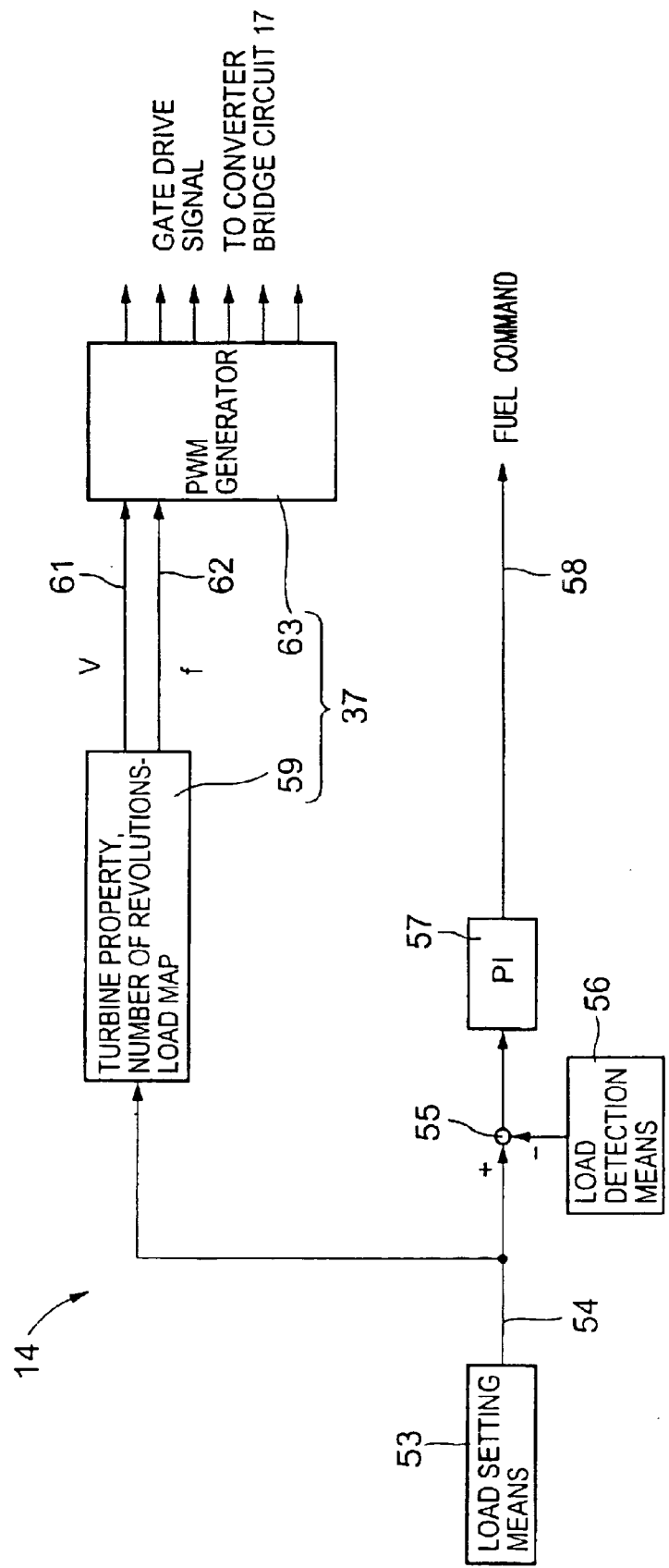
FIG. 4 is a block diagram showing the constitution of the turbine generating apparatus for controlling the converter during system connection running.

FIG. 4 is a block diagram showing the constitution of the turbine generating apparatus 29 for controlling the converter 14 during system connection running. A load setting means 53 sets a load to be output to the grid 27 from the turbine generating apparatus 29, for example, a value of 20 kW, leads a signal indicating the set load to a line 54, and gives it to a subtracter 55. Output of a load detection means 56 is given to the subtracter 55. The load detection means 56 serves to calculate the product of a current from the inverter 19 which is detected by the current sensors 46 and 47 and an output voltage detected by the voltage sensor 49 and to detect a load. The output of the subtracter 55 is given to a control circuit 57 for performing PI control. Thereby, from a line 58 to the gas compressor 5 (refer to FIG. 1), a fuel command signal for controlling the fuel flow rate to be fed to the gas turbine 2 is led. In this way, the fuel flow rate to be fed to the gas turbine 2 is adjusted so that the load detected by the load detection means 56 conforms to the load set by the load setting means 53.

The output of the load setting means 53 via the line 54 is also given to a control circuit 59. The control circuit 59 includes a memory for storing a map of the turbine property indicating the rotational speed of good operation efficiency corresponding to the load of the gas turbine 2 and derives a signal indicating the rotational speed for driving the generator 3 of the gas turbine 2 corresponding to the load set by the load setting means 53. By doing this, the control circuit 59 leads a signal indicating a voltage V generated by the generator 3 to a line 61, leads a signal indicating the frequency of the voltage derived from the generator 3 corresponding to the rotational speed, and gives it to a pulse width modulation (PWM) generator 63. The PWM generator 63 gives a control signal to the gates or bases of the switching transistors Q1c to Q6c constituting the converter bridge circuit 17. In this way, the converter 14 pulse-width modulates the output of the generator 3 at a frequency f corresponding to the rotational speed of the gas turbine 2 at the load set by the load setting means 53, converts it to DC output, and gives the DC output to the inverter 19 via the DC voltage part 18.

Figure 5:
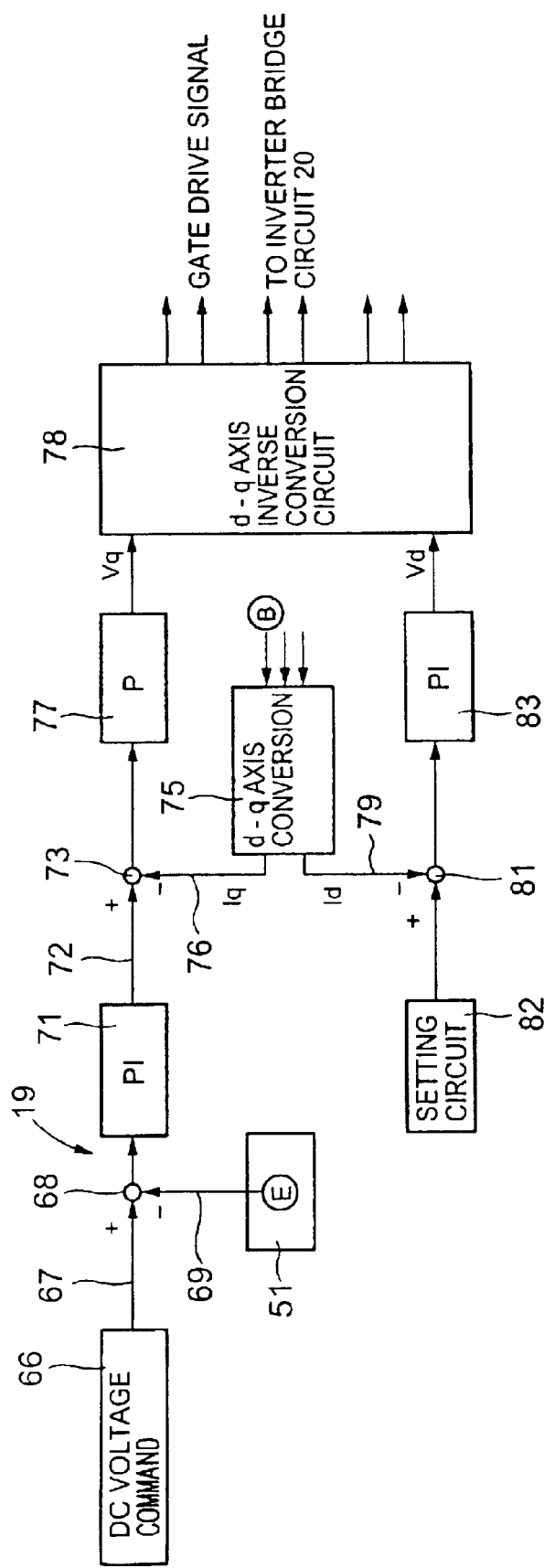
FIG. 5 is a block diagram showing the constitution of the turbine generating apparatus for controlling the inverter during system connection running.

FIG. 5 is a block diagram showing the constitution of the turbine generating apparatus 29 for controlling the inverter 19 during system connection running. A signal indicating the DC voltage set by a DC voltage command 66 is given to a subtracter 68 via a line 67. The voltage of the DC voltage part 18 between the lines 15 and 16 is detected by the voltage sensor 51 and a signal indicating the detected voltage is given to the subtracter 68 via a line 69. The output of the subtracter 68 is given to a PI control circuit 71 and a signal for making the voltage detected by the voltage sensor 51 confirm to the DC voltage set by the DC voltage setting means 66 is given to a subtracter 73 via a line 72.

A signal indicating the output detected by the current sensors 46 and 47 for detecting the output current of the inverter 19 is given to a dq axis conversion circuit 75 and converted to an active current Iq and a reactive current Id. A signal indicating the active current Iq is given to the subtracter 73 through the line 76. The output of the subtracter 73 is given to a P control circuit 77 and a signal indicating an active voltage Vq is given to a dq axis inverse conversion circuit 78. The dq axis conversion circuit 78 leads a control signal to the gates of the switching transistors Q1i to Q6i of the inverter bridge circuit 20. The power-factor of the current led from the inverter 19 via the lines 21 to 23 in this way is taken as 1 and the DC power of the DC voltage part 18 conforms to the voltage and frequency of the grid 27, is fed at the same phase, and given to the load 35.

A signal indicating the reactive current Id led from the dq axis conversion circuit 75 is given to a subtracter 81 from a line 79. The output of a setting circuit 82 for setting the reactive current to 0 is also given to the subtracter 81. The subtracter 81 derives a signal for setting the detected reactive current Id to 0 and prepares a control signal of the inverter bridge circuit 20 by a PI control circuit 83 in the dq axis inverse conversion circuit 78 so as to set the reactive voltage vd of the electric power from the inverter 19 led from the lines 21 to 23 to 0. In this way, the inverter 19 converts the DC voltage of the DC voltage part 18 to an AC voltage by pulse width modulation at the voltage of the grid 27 and the frequency of the grid 27 so as to hold the DC voltage output from the converter 14 at a predetermined voltage by the DC voltage command 66.

Figure 6:
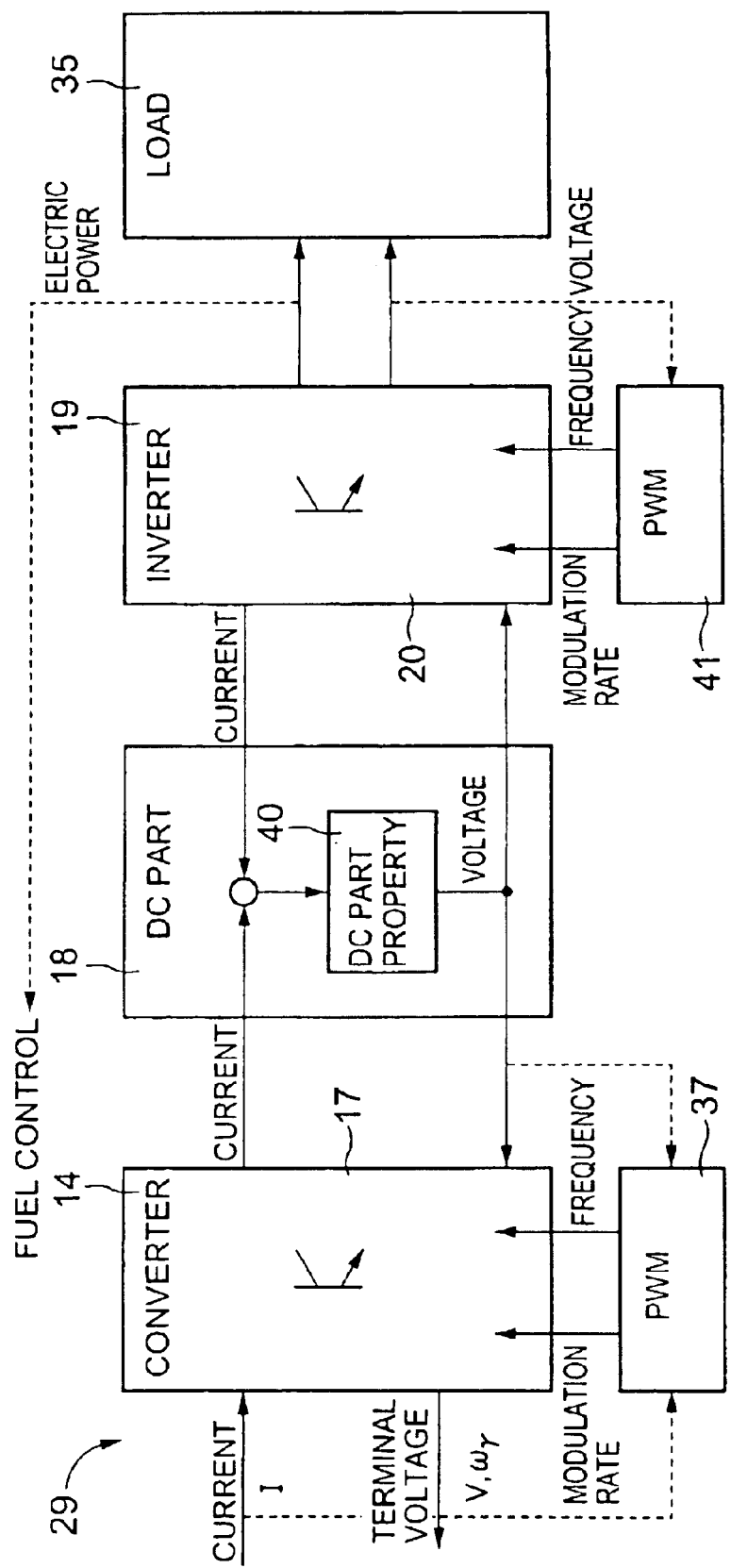
FIG. 6 is a schematic block diagram showing the constitution of the turbine generating apparatus for controlling during independent running.

FIG. 6 is a schematic block diagram showing the constitution of the turbine generating apparatus 29 for controlling during independent running. Independent running is performed when the grid 27 with the lines 31 to 33 is in power failure. During the independent running, the turbine generating apparatus 29 supplies electric power to the load 35 at the same values of voltage and frequency of the grid 27 during the normal running.

Figure 7:
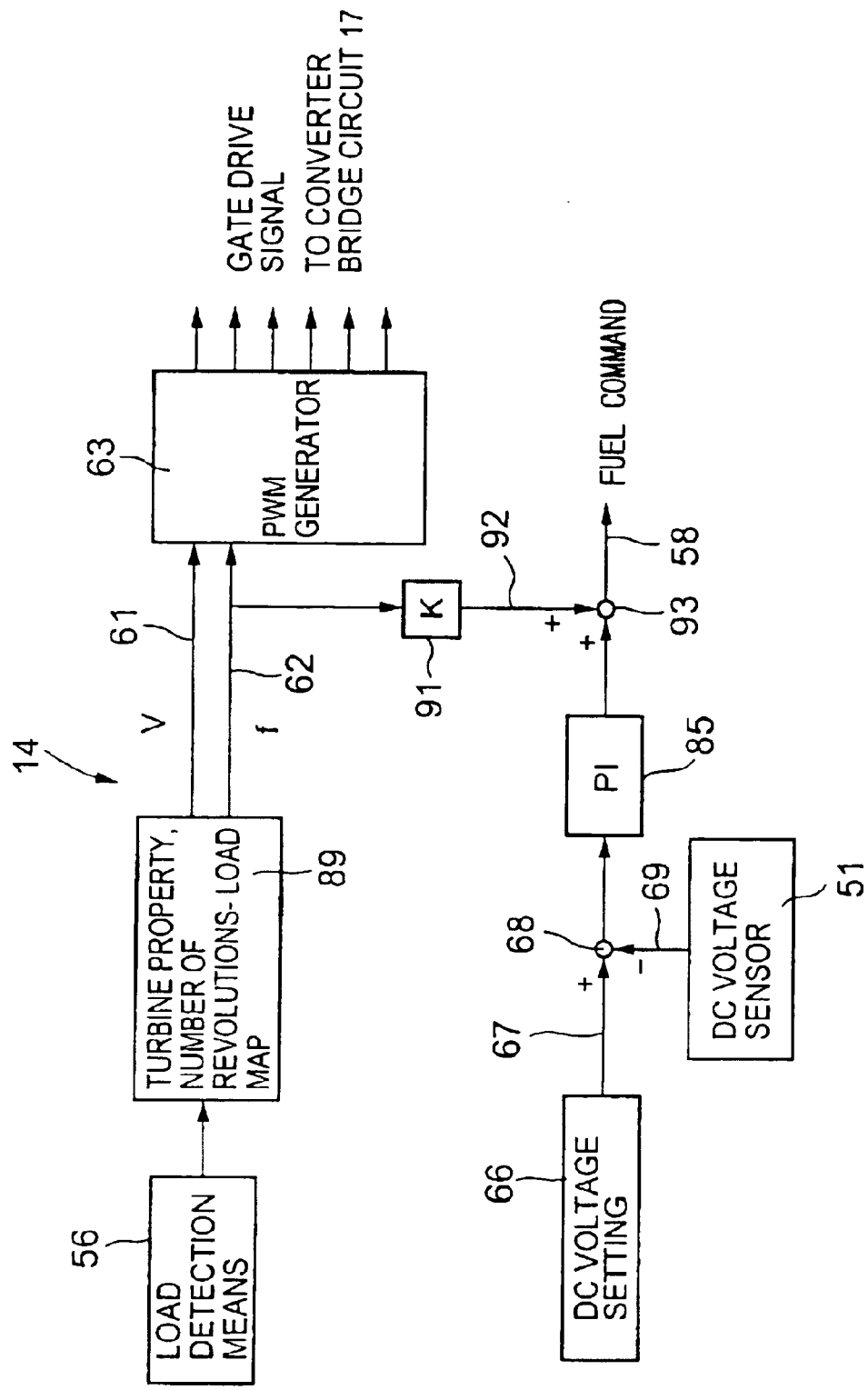
FIG. 7 is a block diagram showing the constitution of the turbine generating apparatus shown in FIG. 6 for controlling the converter during independent running.

FIG. 7 is a block diagram showing the constitution of the turbine generating apparatus 29 shown in FIG. 6 for controlling the converter 14 during independent running. The load detection means 56, as mentioned above, detects a load by the product of the current from the inverter 19 which is detected by the current sensors 46 and 47 and the voltage detected by the voltage sensor 49. A signal indicating the detected load is given to a control circuit 89. The control circuit 89 has the same constitution as that of the control circuit 59 mentioned above and includes a memory for storing a map of the turbine property indicating the rotational speed of the gas turbine 2 corresponding to the detected load. In correspondence with the rotational speed corresponding to the detected load from the control circuit 89, a signal indicating the voltage and frequency f of the generator 3 is led to the lines 61 and 62 and given to the pulse width modulation (PWM) generator 63, thus the switching transistors Q1c to Q6c provided in the converter bridge circuit 17 are controlled.

In this way, the converter 14 pulse-width modulates the output of the generator 3 at a frequency f corresponding to the rotational speed of the gas turbine 2 at the load detected by the load setting means 56 and converts it to DC output. A signal indicating a frequency f of electric power generated by the generator 3 on the line 62 is given to a counter 91, multiplied by a predetermined coefficient k, and given to an adder 93 through a line 92. The output of the adder 93 is given to the gas compressor 5 via the line 58, thus the fuel flow rate to be fed to the gas turbine 2 is decided in correspondence with the load detected by the load detection means 56.

Furthermore, the DC voltage setting means 66 sets the voltage of the DC voltage part 18 and a signal indicating the set voltage is given to the subtracter 68 via the line 67. The voltage sensor 51 detects the voltage between the lines 15 and 16 of the DC voltage part 18 and gives a signal indicating the detected voltage to the subtracter 68 via the line 69. The output of the subtracter 68 is given to a PI control circuit 85. By doing this, a signal for letting the voltage detected by the voltage sensor 51 confirm to the voltage set by the DC voltage setting means 66 is given to the adder 93. In this way, the fuel flow rate to be fed to the gas turbine 2 is also controlled so that the DC voltage output from the converter 14 is held at the voltage set by the DC voltage setting means 66.

Figure 8:
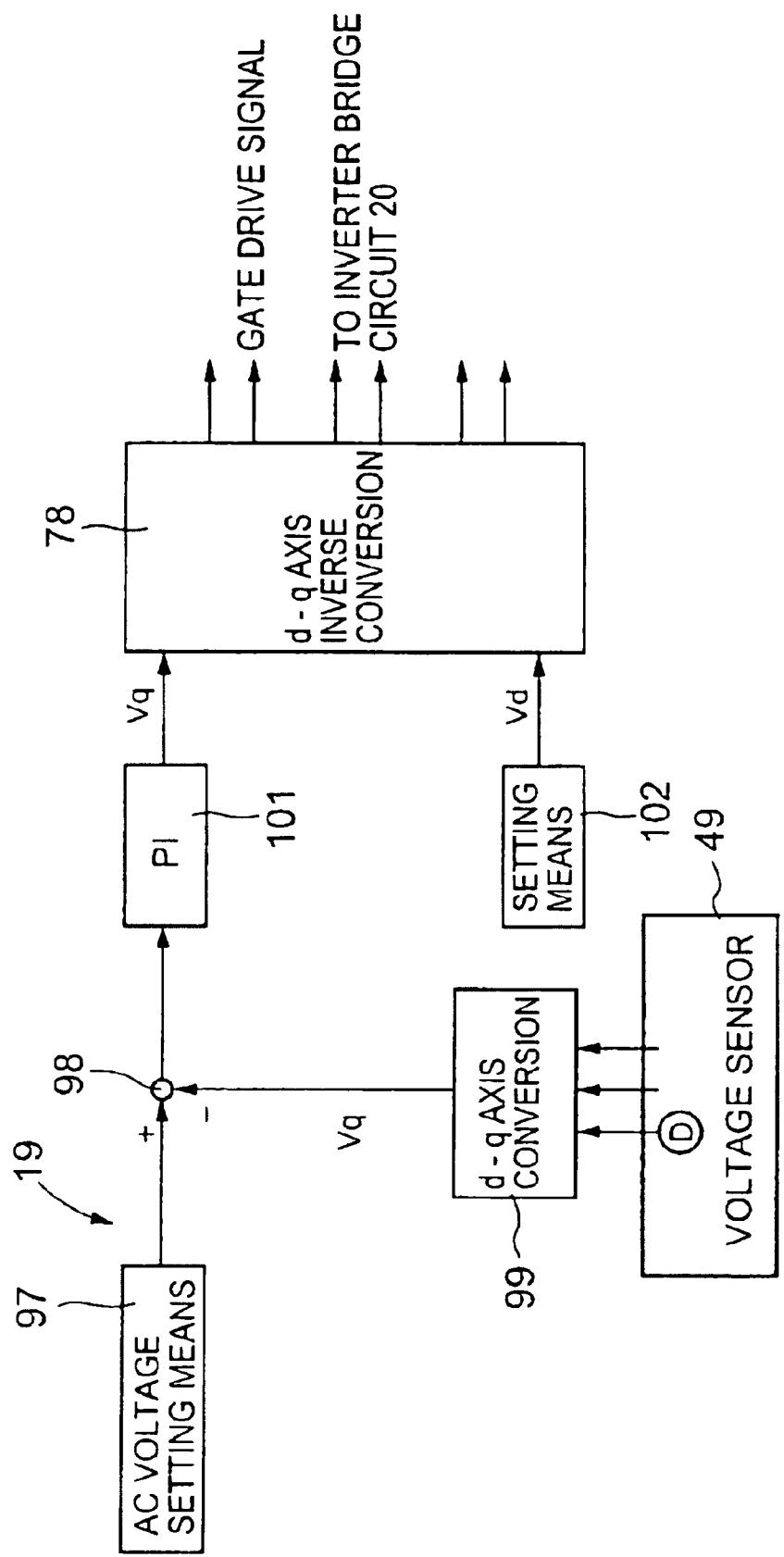
FIG. 8 is a block diagram showing the constitution of the turbine generating apparatus shown in FIG. 6 for controlling the inverter during independent running.

FIG. 8 is a block diagram showing the constitution of the turbine generating apparatus 29 shown in FIG. 6 for controlling the converter 14 during independent running. An AC voltage output from the lines 31 to 33 is set by an AC voltage setting means 97 and a signal indicating the set AC voltage is given to a subtracter 98. The set AC voltage may be, for example, 220 V as mentioned above.

A signal indicating a voltage output from the lines 31 to 33 by the voltage sensor 49 during independent running is given to a dq axis conversion circuit 99 and a signal indicating the active voltage Vq thereof is given to the subtracter 98. The subtracter 98 gives a signal for making the active Vq conform to the AC voltage set by the AC voltage setting means 97 to a PI control circuit 101. The output of the control circuit 101 is given to the dq axis inverse conversion circuit 78. Furthermore, the output from a setting means 102 for setting the reactive voltage Vd led from the lines 31 to 33 to 0 is also given to the dq axis inverse conversion circuit 78. The dq axis inverse conversion circuit 78 gives a control signal to the gates or bases of the switching transistors Q1i to Q6i of the inverter bridge circuit 20. By doing this, the inverter 19, in order to hold the AC voltage which is output from the inverter 19 and detected by the voltage sensor 49 at a predetermined voltage Vs by the AC voltage setting means 97 and to hold the frequency f of the AC voltage detected by the voltage sensor 49 at the frequency of the grid 27 in the normal state, for example, 50 Hz or 60 Hz, converts the DC voltage output from the converter 14 to the DC voltage part 18 to an AC voltage by pulse width modulation.

As shown in FIG. 1, a gate drive circuit 104 includes the pulse width modulation (PWM) generator 63 and the dq axis inverse conversion circuit 78 which are mentioned above. A control circuit 105 shown in FIG. 1 includes the aforementioned components shown in FIGS. 4 to 8 for giving signals to the gate drive circuit 104 and furthermore includes a microcomputer 106. The microcomputer 106 also gives signals to the gate drive circuit 104.

Figure 9:
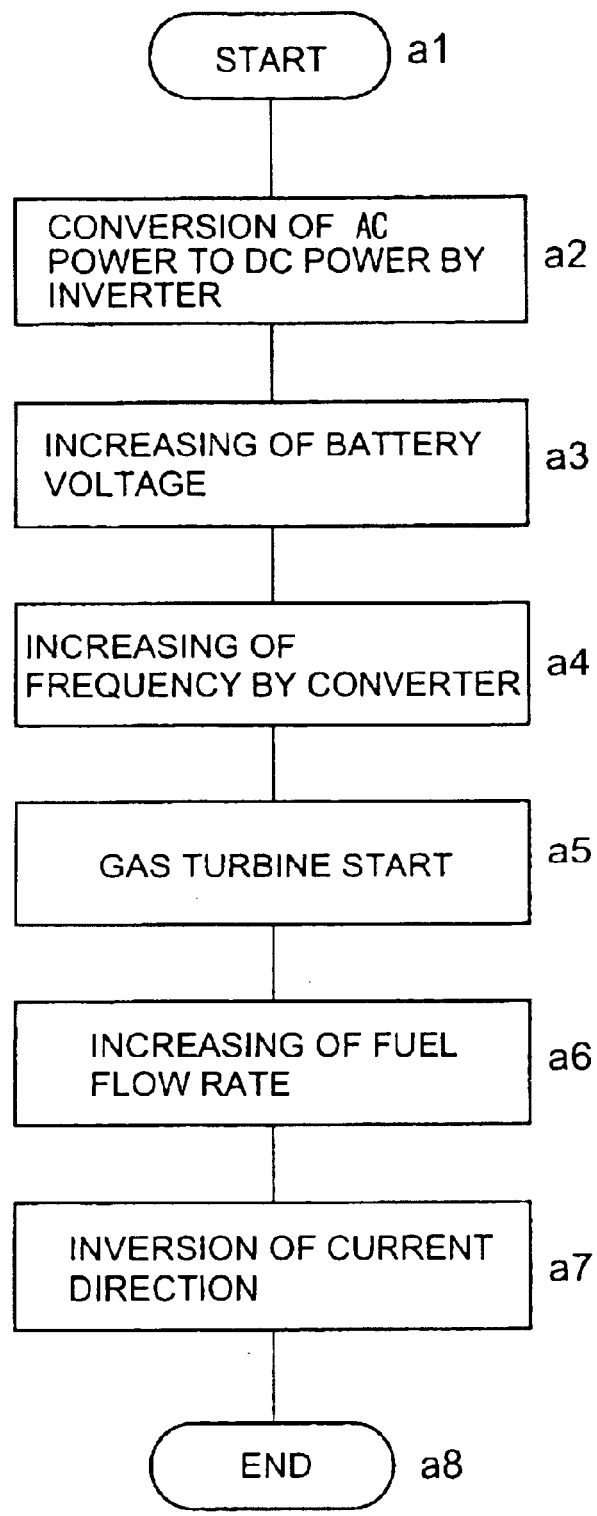
FIG. 9 is a flow chart for explaining the operation of the processing circuit included in the controller at the start of the turbine generating apparatus.

FIG. 9 is a flow chart for explaining the operation of the processing circuit 106 included in the controller 105 at the start of the turbine generating apparatus 29. Moving from Step a1 to Step a2, at the start time, the processing circuit 106 gives a signal to the gate drive circuit 104, performs the switching operation of the switching transistors Q1i to Q6i provided in the inverter bridge circuit 20 of the inverter 19, converts the power of the grid 27 to DC power by pulse width modulation at the frequency of the grid 27, and gives the power from the grid 27 which is converted to DC power by the inverter 19 to the DC voltage part 18. At Step a3, the voltage of the storage battery 38 provided in the DC voltage part 18 is increased.

At Step a4, by performing the switching operation of the switching transistors Q1c to Q6c provided in the converter bridge circuit 17 of the converter 14, the converter 14 increases the frequency of the AC power given to the lines 11 to 13 with time so that the generator 3 operates as a synchronous motor by pulse-width modulating the DC power to be output to the DC voltage part 18 from the inverter 19. In the course of increasing the frequency of the AC power to be given to the generator 3 by the converter 14, at Step a5, the gas turbine 2 is started by feeding and igniting fuel and at Step a6, the flowing rate of fuel to be given to the gas turbine 2 is increased and ignited with time by the gas compressor 5. In this way, at Step a7, the current flowing from the converter 14 toward the generator 3, as the rotational speed of the gas turbine 2, accordingly the generator 3 increases, is inverted so as to flow from the generator 3 toward the converter 14. In this way, the turbine generating apparatus 29 is automatically started.

Figure 10:
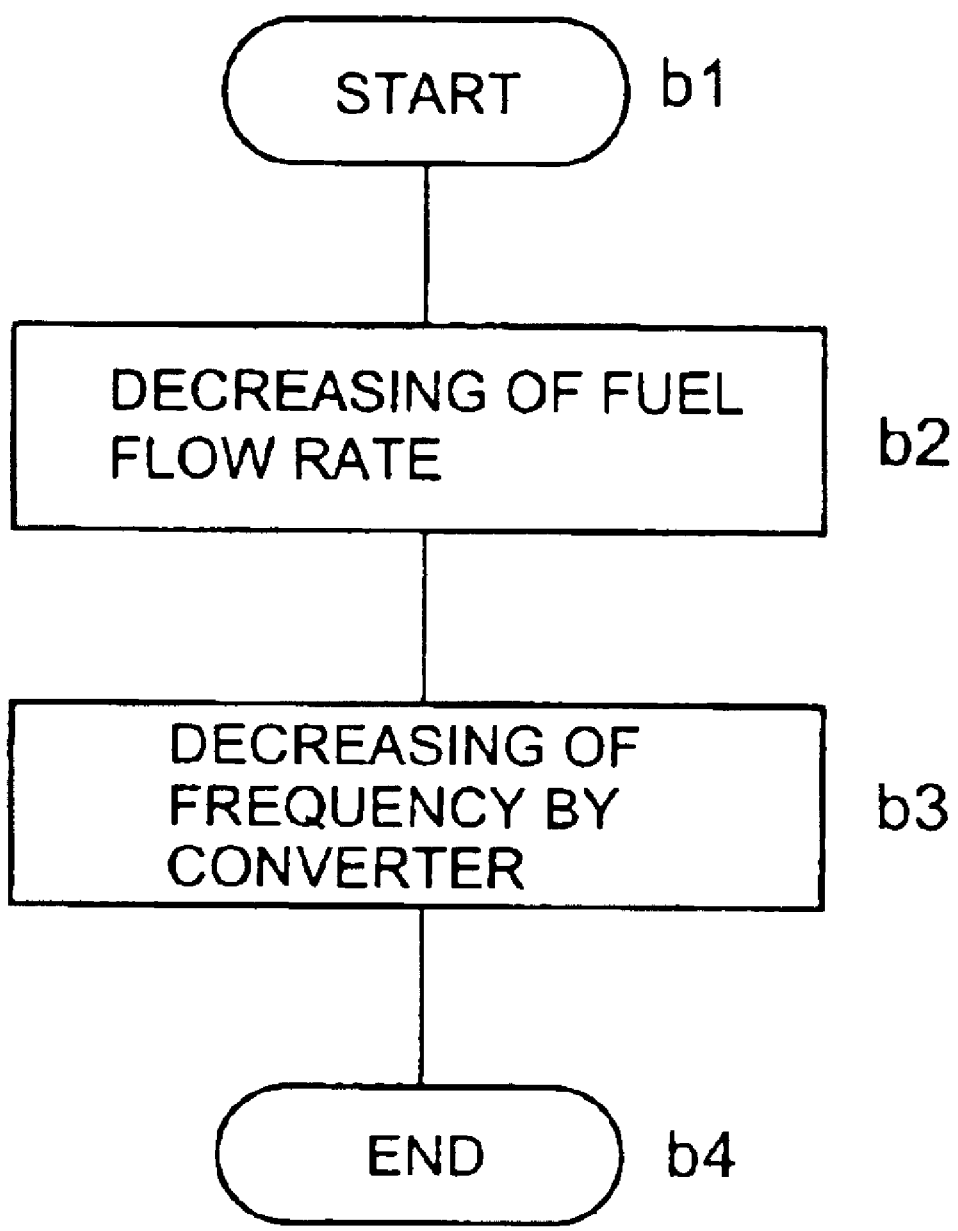
FIG. 10 is a flow chart for explaining the operation of the processing circuit included in the controller at the time of stopping the operation of the turbine generating apparatus.

FIG. 10 is a flow chart for explaining the operation of the processing circuit 106 provided in the controller 105 when the operation of the turbine generating apparatus 29 is to be stopped. The operation of the processing circuit 106 for stopping the operation is basically inverse to the operation at the start time which is shown in FIG. 9. Moving from Step b1 to Step b2, the flow rate of fuel to be given to the gas turbine 2 is reduced with time by the gas compressor 5. At Step b3, in the course of reducing the fuel flow rate at Step b2, the converter 14 reduces with time the frequency for pulse-width modulating the DC power to be output to the inverter 19. In this way, the turbine generator 1 is stopped and the switching transistors Q1c to Q6c and Q1i to Q6i provided in the converter 14 and the inverter 19 are opened.

Figure 11:
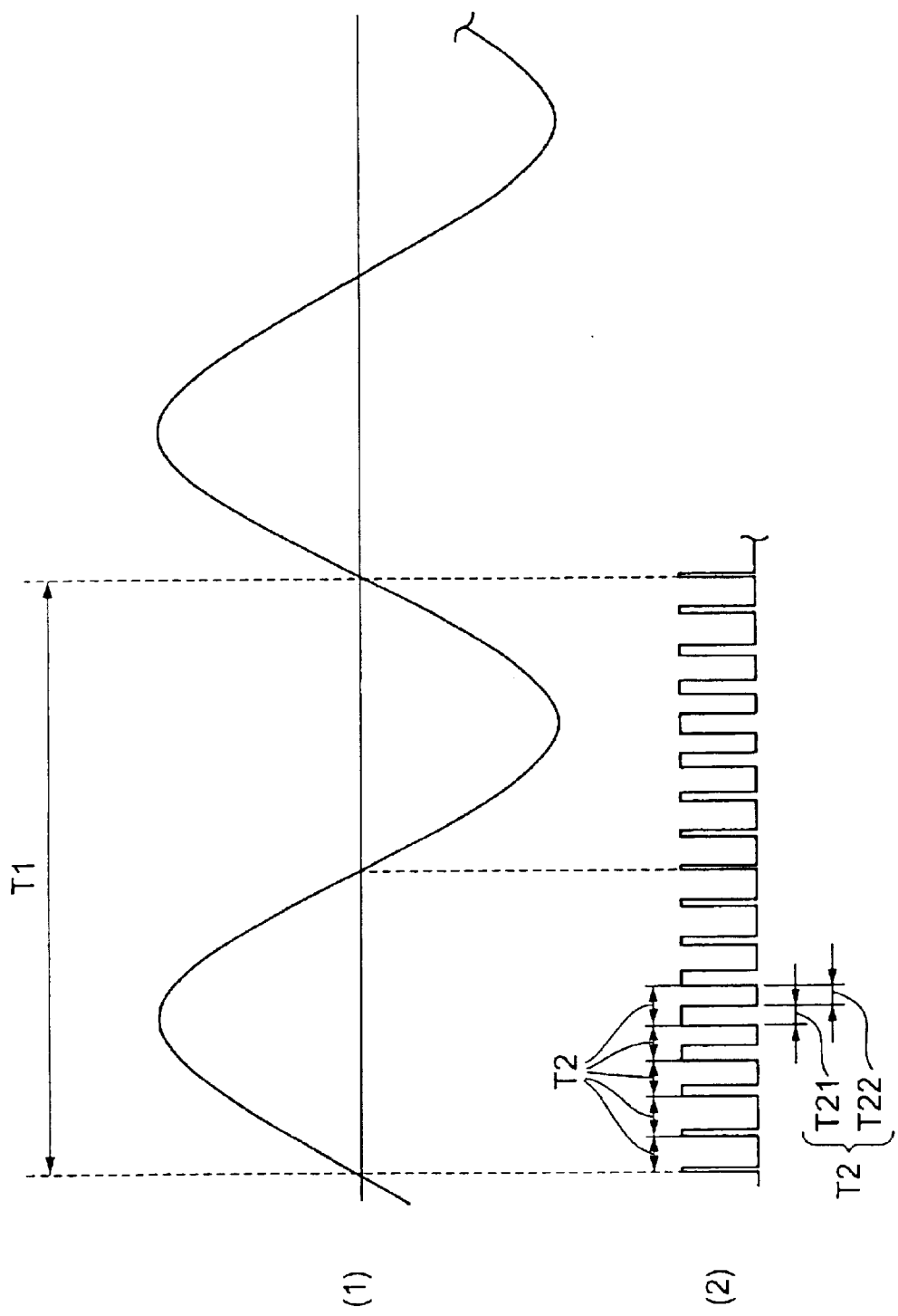
FIG. 11 is a waveform drawing for explaining the pulse width modulation operation of the converter bridge circuit of the converter.
Figure 12:
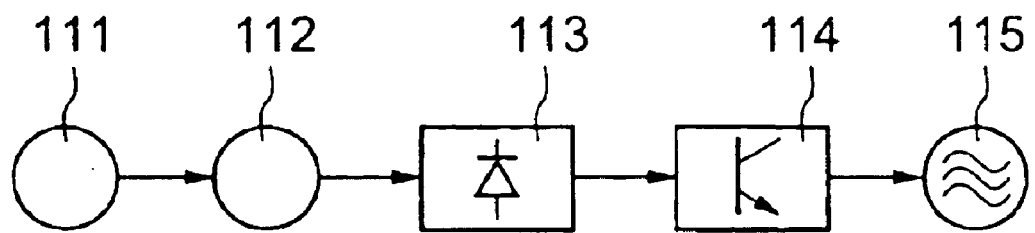
FIG. 12 is a block diagram showing a constitution of a conventional art at the time of power generation.
Figure 13:
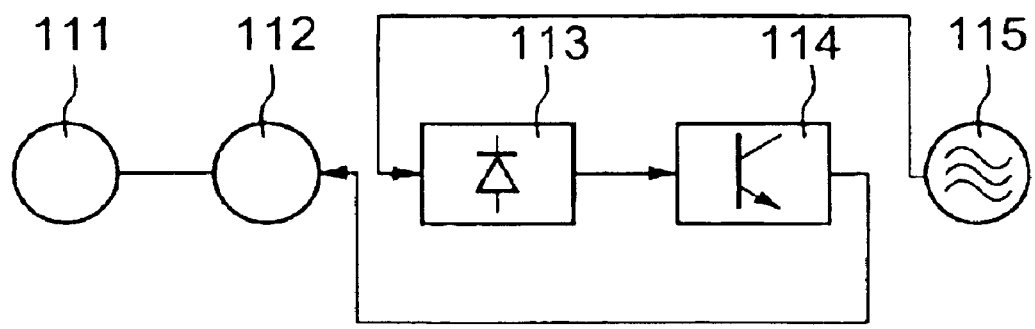
FIG. 13 is a block diagram showing a constitution of the conventional art shown in FIG. 12 at the start time.

FIG. 11 is a waveform drawing for explaining the pulse width modulation operation of the converter bridge circuit 17 of the converter 14. During system connection running, the voltage shown in FIG. 11(1) is led to the lines 11 to 13 from the generator 3. The period of the output voltage from the generator 3 is indicated by a reference symbol T1 and the frequency thereof is, for example, 1 to 1.6 kHz.

FIG. 11(2) shows the switching state of the switching transistors Q1c to Q6c of the converter bridge circuit 17. In a fixed period T2 (T2<T1), a term T21 of ON and a term T22 of OFF (T2=T21+T22) are set in correspondence with the voltage of the DC voltage part 18, that is, a duty D (=T21/T2) is set. This may be true with the inverter bridge circuit 20 of the inverter 19.

According to the present invention, when the output of the inverter is connected to the system, electric power can be output under the condition that high frequency output of the synchronous generator at a varying frequency and voltage from the permanent magnet type synchronous generator driven by the gas turbine is stably converted to a required frequency and voltage. Further, even if the rotational speed of the synchronous generator is lowered, regardless of output changes of the synchronous generator, conversion for deriving stable output can be realized.

Further, according to the present invention, during independent running, by changing the output of the gas turbine, the output voltage and frequency of the inverter can be kept fixed.

Furthermore, according to the present invention, at the start time, the synchronous generator is operated as a motor, thus an automatic starting operation can be performed, and from start to running as a stationary generator, continuous running can be performed, and running stop can be enabled by a continuous operation.

Although the invention has been described in its preferred embodiments with a certain degree of particularity, obviously many changes and variations are possible therein. It is therefore to be understood that the present invention may be practiced otherwise than as specifically described herein without departing from the scope and spirit thereof.

What is claimed is:

1. A turbine generating apparatus comprising:
   (a) a turbine generator including a gas turbine capable of controlling an output thereof by a fuel flow rate and a permanent magnet type synchronous generator connected to said gas turbine,
   (b) a converter connected to said turbine generator,
   (c) an inverter connected between said converter and an AC connection system, and
   (d) a control unit for controlling said turbine generating apparatus so that, during a system connection running mode,
   a fuel is fed to said gas turbine at a fuel flow rate corresponding to a preset load,
   said converter prepares a pseudo-system in which a frequency conforms to a set rotational speed of said gas turbine at said preset load, and converts an output of said generator to a direct current in a state that a number of revolutions of said gas turbine is specified by operating said generator synchronously with said pseudo-system,
   a power to be taken out is controlled depending on a magnitude of a turbine output, and
   said inverter converts a DC voltage output from said converter to an AC voltage by a pulse width modulation at a system voltage and a system frequency so as to keep said DC voltage output from said converter at a predetermined voltage.

2. The turbine generating apparatus according to claim 1, further comprising a power storage element mounted between said converter and said inverter.

3. The turbine generating apparatus according to claim 1, wherein said control unit controls said turbine generating apparatus so that, during starting, said inverter converts a power of said system to a DC power by a pulse width modulation at a frequency of said system, said converter increases a frequency with time and gives said frequency to said synchronous generator operating as a synchronous motor by pulse-width modulating a DC power output from said inverter, said fuel flow rate to be given to said gas turbine is increased with time in a course of increasing said frequency, whereby a current flowing toward said synchronous generator is inverted so as to flow out from said synchronous generator.

4. The turbine generating apparatus according to claim 1, wherein said control unit controls said turbine generating apparatus so that, during stopping, said fuel flow rate to be given to said gas turbine is decreased with time, and said converter decreases with time said frequency for pulse-width modulating said DC power to be output to said inverter in a course of decreasing said fuel flow rate.

5. The turbine generating apparatus according to claim 1, wherein said converter includes:

a converter bridge circuit having a converter switching element with a control terminal for a switching operation of turning power on or off; and a converter control circuit for giving a control signal for said switching operation to said control terminal of said converter switching element.

6. The turbine generating apparatus according to claim 1, wherein said inverter includes:

an inverter bridge circuit having an inverter switching element with a control terminal for a switching operation of turning power on or off; and an inverter control circuit for giving a control signal for said switching operation to said control terminal of said inverter switching element.

7. A turbine generating apparatus comprising:

(a) a turbine generator including a gas turbine capable of controlling an output thereof by a fuel flow rate and a permanent magnet type synchronous generator connected to said gas turbine, (b) a converter connected to said turbine generator, (c) an inverter connected between said converter and an AC connection system, and (d) a control unit for controlling said turbine generating apparatus so that, during an independent running mode, said converter prepares a pseudo-system in which a frequency conforms to a set rotational speed of said gas turbine at a power load which is detected, and converts an output of said generator to a direct current in a state that a number of revolutions of said gas turbine is specified by operating said generator synchronously with said pseudo-system, a fuel is fed to said gas turbine at a fuel flow rate which corresponds to said power load which is detected and keeps a DC voltage output from said converter at a predetermined voltage, and said inverter converts said DC voltage output from said converter to an AC voltage by a pulse width modulation so as to keep said AC voltage output from said inverter at a predetermined voltage and keep a frequency of said AC voltage output from said inverter at a predetermined frequency.

8. The turbine generating apparatus according to claim 7, further comprising a power storage element mounted between said converter and said inverter.

9. The turbine generating apparatus according to claim 7, wherein said control unit controls said turbine generating apparatus so that, during starting, said inverter converts a power of said system to a DC power by a pulse width modulation at a frequency of said system, said converter increases a frequency with time and gives said frequency to said synchronous generator operating as a synchronous motor by pulse-width modulating a DC power output from said inverter, said fuel flow rate to be given to said gas turbine is increased with time in a course of increasing said frequency, and whereby a current flowing toward said synchronous generator is inverted so as to flow out from said synchronous generator.

10. The turbine generating apparatus according to claim 7, wherein said control unit controls said turbine generating apparatus so that, during stopping, said fuel flow rate to be given to said gas turbine is decreased with time, and said converter decreases with time said frequency for pulse-width modulating said DC power to be output to said inverter in a course of decreasing said fuel flow rate.

11. The turbine generating apparatus according to claims 7, wherein said converter includes:

a converter bridge circuit having a converter switching element with a control terminal for a switching operation of turning power on or off; and a converter control circuit for giving a control signal for said switching operation to said control terminal of said converter switching element.

12. The turbine generating apparatus according to claim 7, wherein said inverter includes:

an inverter bridge circuit having an inverter switching element with a control terminal for a switching operation of turning power on or off; and an inverter control circuit for giving a control signal for said switching operation to said control terminal of said inverter switching element.

13. A turbine generating apparatus capable of changing an operating mode thereof comprising:

(a) a turbine generator including a gas turbine capable of controlling an output thereof by a fuel flow rate and a permanent magnet type synchronous generator connected to said gas turbine, (b) a converter connected to said turbine generator, (c) an inverter connected between said converter and an AC connection system, and (d) a control unit for controlling said turbine generating apparatus so that, during a system connection running mode, a fuel is fed to said gas turbine at a fuel flow rate corresponding to a preset load, said converter prepares a pseudo-system in which a frequency conforms to a set rotational speed of said gas turbine at said preset load, and converts an output of said generator to a direct current in a state that a number of revolutions of said gas turbine is specified by operating said generator synchronously with said pseudo-system, a power to be taken out is controlled depending on a magnitude of a turbine output, and said inverter converts a DC voltage output from said converter to an AC voltage by a pulse width modulation at a system voltage and a system frequency so as to keep said DC voltage output from said converter at a predetermined voltage, during an independent running mode, said converter prepares a pseudo-system in which a frequency conforms to a set rotational speed of said gas turbine at a power load which is detected, and converts an output of said generator to a direct current in a state that a number of revolutions of said gas turbine is specified by operating said generator synchronously with said pseudo-system, a fuel is fed to said gas turbine at a fuel flow rate which corresponds to said power load which is detected and keeps a DC voltage output from said converter at a predetermined voltage, and said inverter converts said DC voltage output from said converter to an AC voltage by a pulse width modulation so as to keep said AC voltage output from said inverter at a predetermined voltage and keep a frequency of said AC voltage output from said inverter at a predetermined frequency.

14. The turbine generating apparatus according to claim 13, further comprising a power storage element mounted between said converter and said inverter.

15. The turbine generating apparatus according to claim 13, wherein said control unit controls said turbine generating apparatus so that, during starting, said inverter converts a power of said system to a DC power by a pulse width modulation at a frequency of said system, said converter increases a frequency with time and gives said frequency to said synchronous generator operating as a synchronous motor by pulse-width modulating a DC power output from said inverter, said fuel flow rate to be given to said gas turbine is increased with time in a course of increasing said frequency, and whereby a current flowing toward said synchronous generator is inverted so as to flow out from said synchronous generator.

16. The turbine generating apparatus according to claim 13, wherein said control unit controls said turbine generating apparatus so that, during stopping, said fuel flow rate to be given to said gas turbine is decreased with time, and said converter decreases with time said frequency for pulse-width modulating said DC power to be output to said inverter in a course of decreasing said fuel flow rate.

17. The turbine generating apparatus according to claim 13, wherein said converter includes:

a converter bridge circuit having a converter switching element with a control terminal for a switching operation of turning power on or off; and a converter control circuit for giving a control signal for said switching operation to said control terminal of said converter switching element.

18. The turbine generating apparatus according to claim 13, wherein said inverter includes:

an inverter bridge circuit having an inverter switching element with a control terminal for a switching operation of turning power on or off; and an inverter control circuit for giving a control signal for said switching operation to said control terminal of said inverter switching element.

19. A turbine generating apparatus comprising:

a converter preparing a pseudo-system in which a frequency conforms to a set rotational speed of a gas turbine according to a load;

a control unit for controlling said turbine generating apparatus so that said converter converts an output of a generator to a direct current in a state that a number of revolutions of said gas turbine is specified by operating a generator synchronously with said pseudo-system, wherein, when a required electric power is lower than a specified value, said control unit decreases said frequency output by said converter, reduces the number of revolutions of said gas turbine, thereby enables an operation at a number of revolutions for optimizing a turbine efficiency.

* * * * *